(12) United States Patent
Hasebe et al.

(10) Patent No.: US 7,597,347 B2
(45) Date of Patent: Oct. 6, 2009

(54) AIRBAG AND AIRBAG DEVICE

(75) Inventors: Masahiro Hasebe, Tokyo (JP); Yukitoshi Narimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/947,478

(22) Filed: Nov. 29, 2007

(65) Prior Publication Data

US 2008/0073882 A1 Mar. 27, 2008

Related U.S. Application Data

(63) Continuation of application No. 10/966,094, filed on Oct. 15, 2004, now Pat. No. 7,316,416.

(30) Foreign Application Priority Data

Nov. 14, 2003 (JP) ............................. 2003-385325

(51) Int. Cl.
   B60R 21/16 (2006.01)
(52) U.S. Cl. ..................................... 280/729; 280/743.1
(58) Field of Classification Search .............. 280/730.1, 280/743.1, 729, 728.1, 731, 732
   See application file for complete search history.

(56) References Cited

U.S. PATENT DOCUMENTS

| | | | | |
|---|---|---|---|---|
| 3,752,501 A | * | 8/1973 | Daniel et al. ................. | 280/729 |
| 3,792,873 A | * | 2/1974 | Buchner et al. ........... | 280/743.1 |
| 4,262,931 A | * | 4/1981 | Strasser et al. .............. | 280/729 |
| 5,683,109 A | * | 11/1997 | Birman .................... | 280/743.2 |
| 5,853,191 A | * | 12/1998 | Lachat ..................... | 280/730.2 |
| 5,934,701 A | * | 8/1999 | Furukawa ................ | 280/730.1 |
| 5,941,559 A | * | 8/1999 | Rudolf et al. ................ | 280/729 |
| 6,270,113 B1 | * | 8/2001 | Wipasuramonton et al. ...... | 280/730.2 |
| 6,364,348 B1 | * | 4/2002 | Jang et al. ................. | 280/730.2 |
| 6,540,254 B2 | * | 4/2003 | Bieber et al. ................. | 280/732 |
| 6,802,534 B2 | * | 10/2004 | Neupert .................... | 280/743.1 |
| 6,834,886 B2 | * | 12/2004 | Hasebe et al. ............ | 280/743.1 |
| 6,969,086 B2 | * | 11/2005 | Hasebe et al. ............ | 280/743.1 |
| 7,000,943 B2 | * | 2/2006 | Hasebe et al. ................ | 280/729 |
| 7,108,282 B2 | * | 9/2006 | Hasebe et al. ............ | 280/743.1 |
| 7,121,584 B2 | * | 10/2006 | Hasebe et al. ............ | 280/743.2 |
| 7,152,877 B2 | * | 12/2006 | Hasebe et al. ............ | 280/743.1 |
| 7,163,229 B2 | * | 1/2007 | Hasebe et al. ............ | 280/730.1 |
| 2001/0052691 A1 | * | 12/2001 | Bieber et al. ............. | 280/730.1 |
| 2003/0141702 A1 | * | 7/2003 | Keutz ....................... | 280/728.1 |
| 2003/0218325 A1 | * | 11/2003 | Hasebe et al. ............ | 280/743.2 |
| 2005/0206137 A1 | * | 9/2005 | Takimoto ..................... | 280/729 |

(Continued)

FOREIGN PATENT DOCUMENTS

JP          4923176       *  6/1974

Primary Examiner—Paul N. Dickson
Assistant Examiner—Drew J. Brown
(74) Attorney, Agent, or Firm—Fitch, Even, Tabin & Flannery

(57) ABSTRACT

An airbag and airbag device are provided wherein the left airbag section and right airbag section both expand generally uniformly. An airbag comprises a right airbag section which expands at the right side ahead of the passenger, and a left airbag section which expands at the left side ahead of the passenger. Openings are provided on the facing faces of the right airbag section and the left airbag section at a portion partway along the direction of expansion, the perimeter portions of the openings and are sewn together. The inner space of the right airbag section and the left airbag section communicate through the openings.

20 Claims, 5 Drawing Sheets

U.S. PATENT DOCUMENTS

| | | | |
|---|---|---|---|
| 2006/0082114 A1* | 4/2006 | Heym et al. | 280/743.1 |
| 2006/0131859 A1* | 6/2006 | Kumagai | 280/743.1 |
| 2006/0186647 A1* | 8/2006 | Bosch | 280/729 |

* cited by examiner

AIRBAG AND AIRBAG DEVICE

FIELD OF THE INVENTION

The present invention relates to an airbag and airbag device for protecting passengers at the time of a vehicle colliding or the like, and particularly relates to an airbag and airbag device having a left airbag section and right airbag section which expand at the left side and right side ahead of the passenger.

BACKGROUND OF THE INVENTION

As an airbag for protecting passengers at the time of a vehicle colliding or the like, Japanese Unexamined Patent Application Publication No. 4-292239 discloses an airbag having a left airbag section and right airbag section which expand at the left side and right side ahead of the passenger, both of which are expanded by a common inflator. With the airbag in the Publication, the tip portions of the left airbag section and right airbag section are linked with each other by a tie panel.

This airbag is folded and stored in a case, and is covered with a cover. Upon the inflator (gas generator) operating to discharge gas at the time of the vehicle colliding, the airbag pushes open the cover while expanding toward the front of the passenger.

SUMMARY OF THE INVENTION

With the airbag in the above Japanese Unexamined Patent Application Publication No. 4-292239, more gas flows into one or the other of the left airbag section and right airbag section from the inflator at the time of the airbag sections inflating, and there is the danger that inflation of one airbag section might be delayed as compared to the other airbag section.

It is an object of the present invention to provide an airbag and airbag device wherein the left airbag section and right airbag section both expand generally uniformly.

With the airbag disclosed in Japanese Unexamined Patent Application Publication No. 4-292239, the tip portions of the left airbag section and right airbag section are linked with each other by a tie panel, so upon the airbag expanding, the lateral center of the body of the passenger is received by the tie panel.

It is an object of the present invention to provide an airbag and airbag device configured in one arrangement such that the inflated left airbag section receives the left chest of the passenger, and the right airbag section receives the right chest thereof, with a open space portion of the inflated airbag facing the lateral center of the chest of the passenger.

The airbag according to the present invention is an airbag of which tip side expands in a direction away from the base end by emitted gas from an inflator disposed at the base end, the airbag comprising: a left airbag section which expands at the left side ahead of the passenger; and a right airbag section which expands at the right side ahead of the passenger; wherein the left airbag section and the right airbag section are joined together at a portion partway along the direction of expansion, and also communicate at this joined portion.

In one form of the present invention, openings are provided to each of the opposing faces of the left airbag section and the right airbag section, with the edge portions of each of the openings joined together, and the left airbag section and right airbag section communicating via the openings.

In this case, the edge portions of the openings may be configured directly joined one to another, or may be configured joined one to another via a duct member.

The airbag device according to the present invention comprises the airbag according to the present invention.

With the airbag according to the present invention, the left airbag section and the right airbag section are joined together at a portion partway along the direction of expansion, and also communicate at this joined portion, so while expanding, gas moves between the left airbag section and the right airbag section through this joined portion (communicating portion). Accordingly, even in the event that more gas flows from the inflator into one of the left airbag section and the right airbag section than the other, the internal pressure of the left airbag section and the right airbag section is generally uniform, and according expansion is generally uniform.

Also, even in the event that one of the left airbag section and the right airbag section starts to expand before the other, the left airbag section and the right airbag section are joined together at a portion partway along the direction of expansion, so the airbag section which has started to expand first pulls the airbag section which is slower in expanding in the direction of expansion so as to promote expansion thereof, and accordingly both expand generally uniformly.

With the present invention, openings are provided to each of the opposing faces of the left airbag section and the right airbag section, with the edge portions of each of the openings joined together, and the left airbag section and right airbag section communicating via the openings, whereby a configuration wherein the left airbag section and the right airbag section are joined together at a portion partway along the direction of expansion, while both communicating at this joined portion, can be easily configured.

In the event of configuring the edge portions of the openings directly joined one to another, the configuration of the airbag can be made extremely simple.

Also, in the event of configuring the edge portions of the openings joined one to another via a duct member, the left airbag section and the right airbag section can be made to be joined and communicate through the duct member even in the event that a gap (open space) is formed therebetween.

DETAILED DESCRIPTION OF THE PREFERRED EMBODIMENTS

Figure 1:
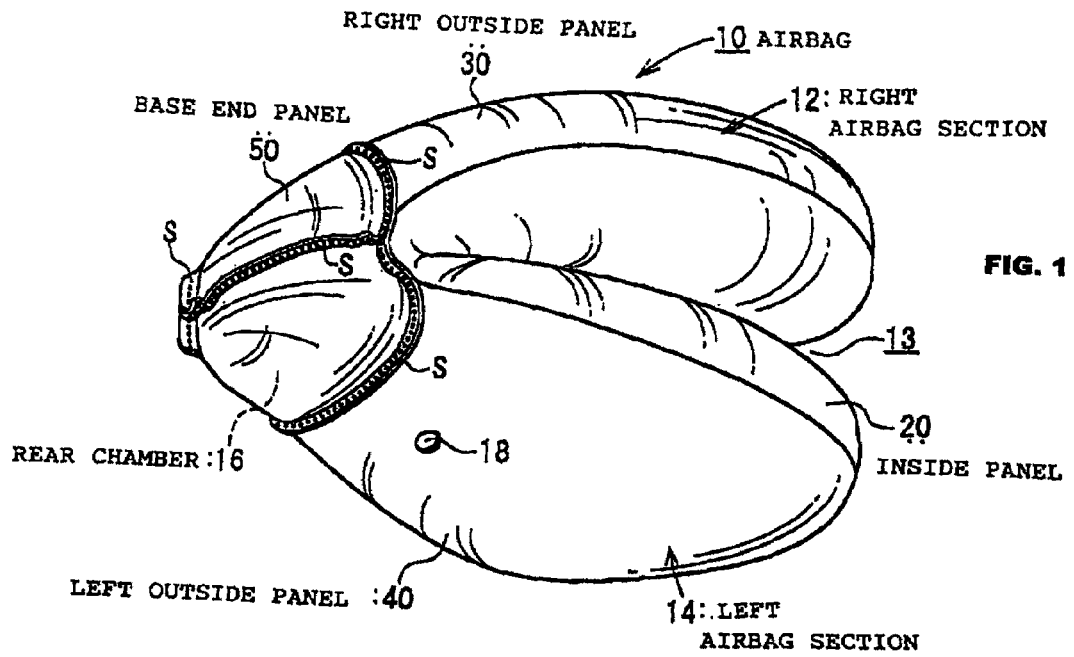
FIG. 1 is a perspective view of the airbag according to an embodiment.
Figure 2:
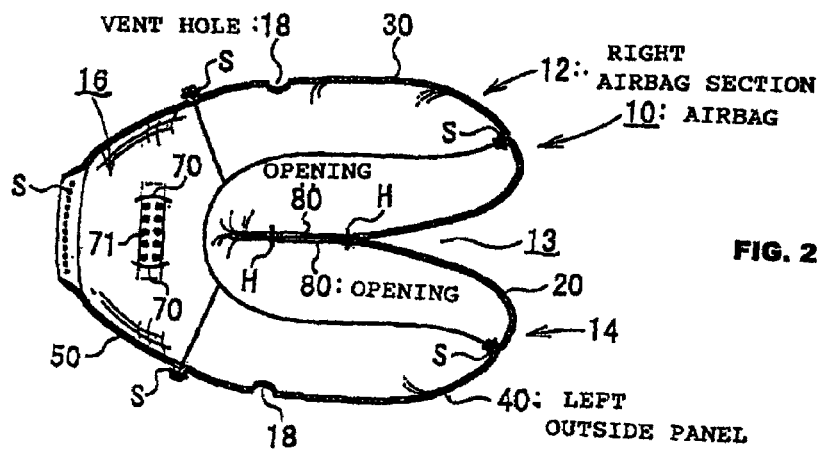
FIG. 2 is a top cross-sectional view of the airbag shown in FIG. 1.
Figure 3:
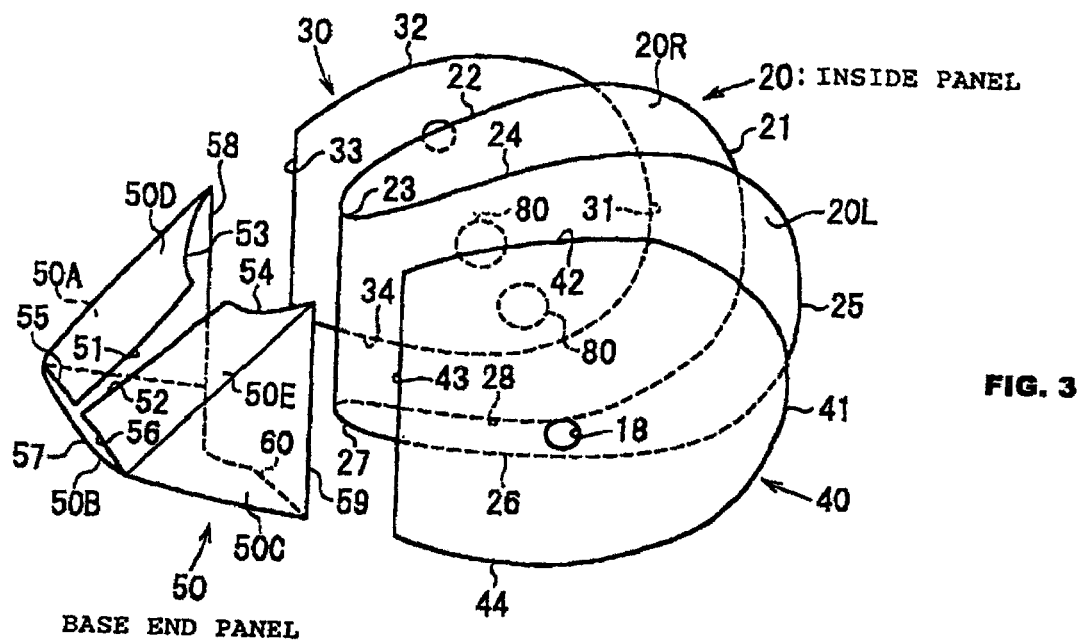
FIG. 3 is a disassembled perspective view illustrating a panel configuration of the airbag shown in FIG. 1.

FIG. 1 is a perspective view illustrating an expanded state of the an airbag 10 according to an embodiment of the present invention, FIG. 2 is a top cross-sectional view of the airbag 10, and FIG. 3 is a disassembled perspective view of the airbag 10. Also, FIGS. 4 through 7 are explanatory diagrams illustrating the procedures for fabricating this airbag 10.

This airbag 10 comprises a right airbag section 12 which expands at the right side ahead of the passenger, a left airbag section 14 which expands at the left side ahead of the passenger, and a rear chamber 16 communicating with the base end of the right airbag section 12 and the left airbag section 14. A gas port (reference numeral omitted) of an inflator 71 is disposed within the rear chamber 16.

As shown in FIG. 2, in the state that this airbag 10 is inflated, there are no bridge members such as tie panels between the tip portions of the right airbag section 12 and the left airbag section 14, with the open space 13 formed between the tip portions of the bags 12 and 14 being opened toward the passenger (i.e., in the direction toward the right in FIG. 2).

In the state that the airbag 10 has completed expanding, the gap between the tip of the right airbag section 12 and the tip of the left airbag section 14 is preferably 150 to 350 mm, more preferably 170 to 330 mm.

Vent holes 18 are provided on the outer side faces of the right airbag section 12 and left airbag section and 14.

With this airbag 10, openings 80 are provided to both the right airbag section 12 and the left airbag section 14 facing one another at the partway portion in the direction of expansion (the right side 20R and left side 20L of the later-described inside panel 20), and the perimeter portions of the openings 80 and 80 are sewn together so as to concentrically overlap. The reference character H in FIG. 2 indicates the stitches. That is to say, the airbag 10 has the partway portion in the direction of expansion of the right airbag section 12 and the partway portion in the direction of expansion of the left airbag section 14 linked by the openings 80 and 80 being sewn at the perimeter portions thereof, with the interior space of both the bags 12 and 14 communicating via the openings 80 and 80.

Note that means for joining the perimeter portions of the openings 80 and 80 may be joining means other than sewing, such as adhesion or fusing, depending on the material and the like of the panel making these up, or these may be combined. Also, a sealing material or the like may be introduced between the perimeter portions of the openings 80 and 80.

With this embodiment, the openings 80 and 80 and the vent holes 18 and 18 are at positions which do not face one another. That is to say, the openings 80 and 80 and the vent holes 18 and 18 are placed such that the center axial lines thereof do not mutually overlap, with the openings 80 and 80 each facing the outer panels of the right airbag section 12 and the left airbag section 14 (the later-described right outer panel 30 and left outer panel 40), and with the vent holes 18 and 18 each facing the inner panels of the right airbag section 12 and the left airbag section 14 (the right side portion 20R and left side portion 20L of the later-described inside panel 20). Note that in the present invention, the openings 80 and 80 and the vent holes 18 and 18 may be placed such that each faces one another.

The inflator 71 is rod-shaped in the present embodiment, with partway portions in the longitudinal direction thereof being gas port. As shown in FIG. 2, with the present embodiment, one pair of parallel slits 70 and 70 are provided on a panel making up the lower face side of the rear chamber 16 (the bottom portion of the later-described base end panel 50), and the gas port of the inflator 71 is disposed via the slits 70 and 70 within the rear chamber 16. Note that both end portions of the inflator 71 are disposed outside of the airbag 10 via the slits 70 and 70.

The panel configuration and fabrication procedures of the airbag 10 will be described now.

The airbag 10 comprises an inside panel 20, right outside panel 30, left outside panel 40, and base end panel 50, a total of 4 panels.

The inside panel 20 is a generally gourd-shaped long and slender panel, and is folded into two at the center to form the right side portion 20R and left side portion 20L. With the inside panel 20, the right side 20R makes up the inner side face of the right airbag section 12, and the left side 20L makes up the inner side face of the left airbag section 14. The inside panel 20 has the edge portions along the entire perimeter formed as the lower edge 28, the tip edge 21, and the upper edge 22 of the right side 20R; the upper edge 23 around the fold-back portion making up the deepest portion of the recess of the airbag; the upper edge 24, the tip edge 25, and the lower edge 26 of the left side 20L; and the lower edge 27 around the fold-back portion. An aforementioned opening 80 is provided to each the right side 20R and left side 20L.

The right outside panel 30 and left outside panel 40 have the edge portions along the entire perimeter formed as the tip edges 31 and 41, the upper edges 32 and 42, the straight rear edges 33 and 43, and the lower edges 34 and 44, respectively.

The base end panel 50 has a right side face 50A, a base face 50B, a left side face 50C, a right flap 50D making up the upper right side, and a left flap 50E making up the upper left side. The base end panel 50 is folded such that the side faces 50A and 50C form general triangular forms, with the face facing the tip side of the airbag being opened.

The base end panel has the entire perimeter formed of the facing edges 51 and 52 of the generally-rectangular flaps 50D and 50E, the front edges 53 and 54 of the flaps 50D and 50E (front edges of the flaps), rear edges 55 and 56 of the flaps 50D and 50E, the rear edge 57 facing the rear edges 55 and 56, the front edges 58 and 59 of the side faces 50A and 50C (the side front edges), and the bottom front edge 60 connecting the side front edges 58 and 59.

Figure 4:
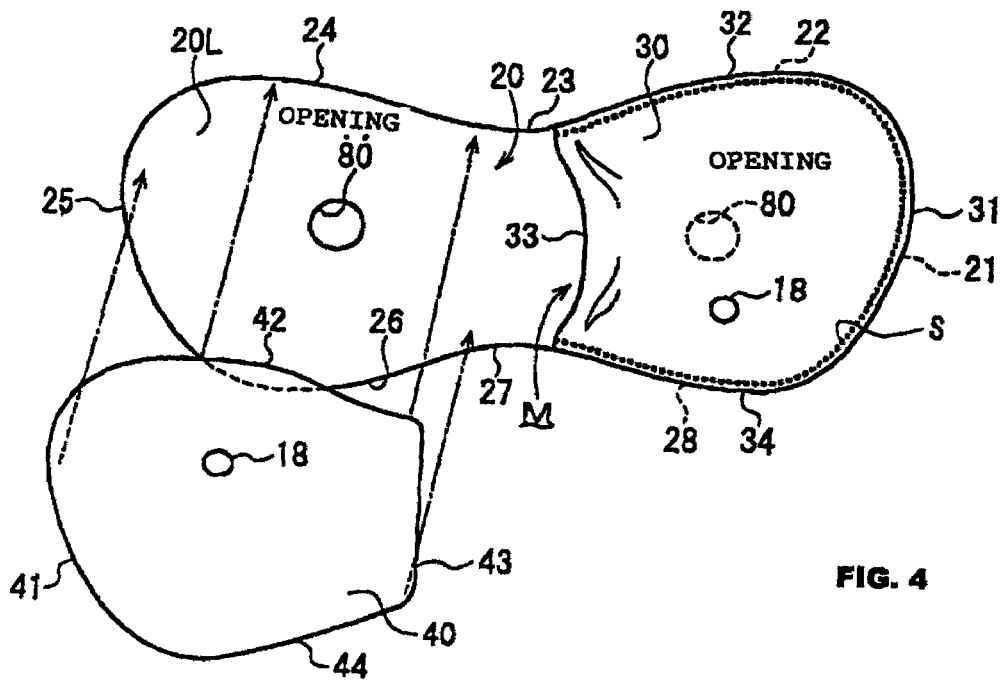
FIG. 4 is an explanatory diagram illustrating the fabrication procedures of the airbag shown in FIG. 1.

To fabricate the airbag 10, first, as shown in FIG. 4, the inside panel 20 is laid out flat, the right side 20R of the inside panel 20 and the right outside panel 30 are made to face such that the faces of both facing outwards (the faces exposed externally when formed as an airbag product, hereafter the same) are made to face one another, and the tip edges 21 and 31 are sewn to each other, and also the upper edges 22 and 32, and lower edges 28 and 34, respectively. Also, the left side 20R of the inside panel 20 and the left outside panel 40 are made to face such that the faces of both facing outwards are made to face one another, and the tip edges 25 and 41 are sewn to each other, and also the upper edges 24 and 42, and lower edges 26 and 44, respectively. The reference character S denotes the stitches.

This sewing forms the right airbag section 12 and the left airbag section 14 in an inside-out state.

Figure 5:
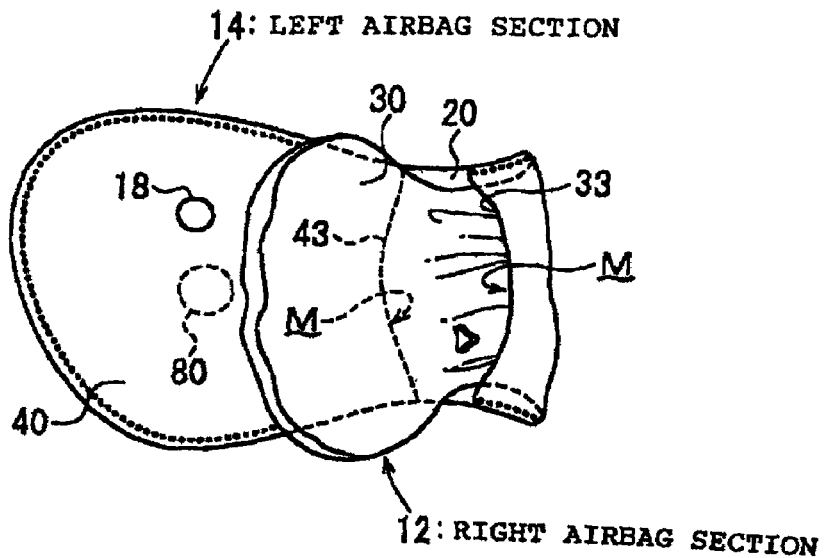
FIG. 5 is an explanatory diagram illustrating the fabrication procedures of the airbag shown in FIG. 1.

Next, as shown in FIG. 5, the right airbag section 12 is turned right-side-out through the opening M between the rear edge 33 of the right outside panel 30 and the inside panel 20, and also the left airbag section 14 is turned right-side-out through the opening M between the rear edge 43 of the left outside panel 40 and the inside panel 20. Thus, the stitches are prevented from being exposed on the outer face of the right airbag section 12 and the left airbag section 14.

Figure 6:
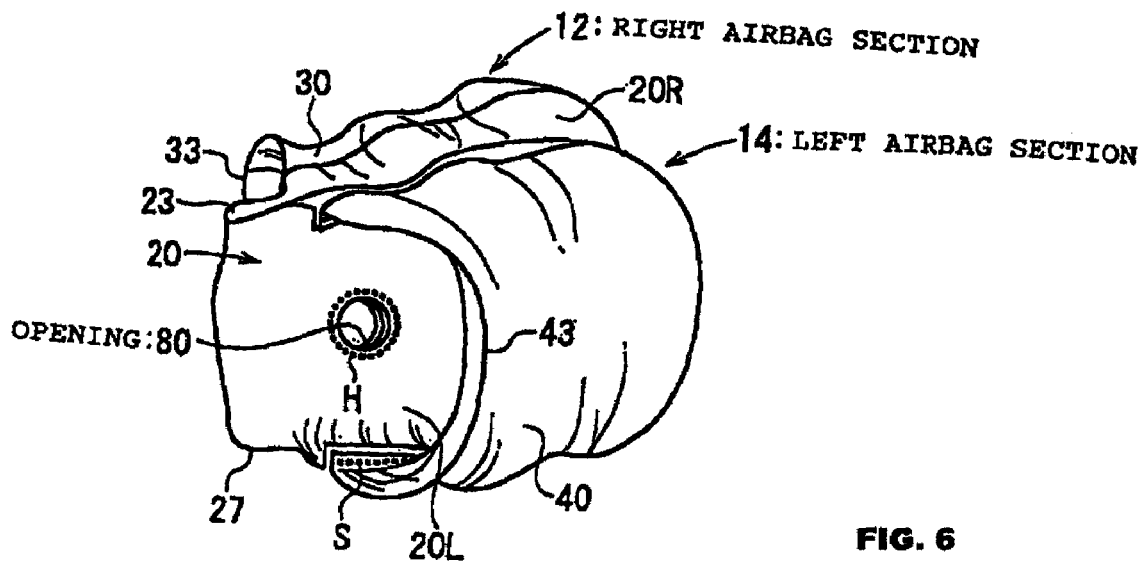
FIG. 6 is an explanatory diagram illustrating the fabrication procedures of the airbag shown in FIG. 1.
Figure 7:
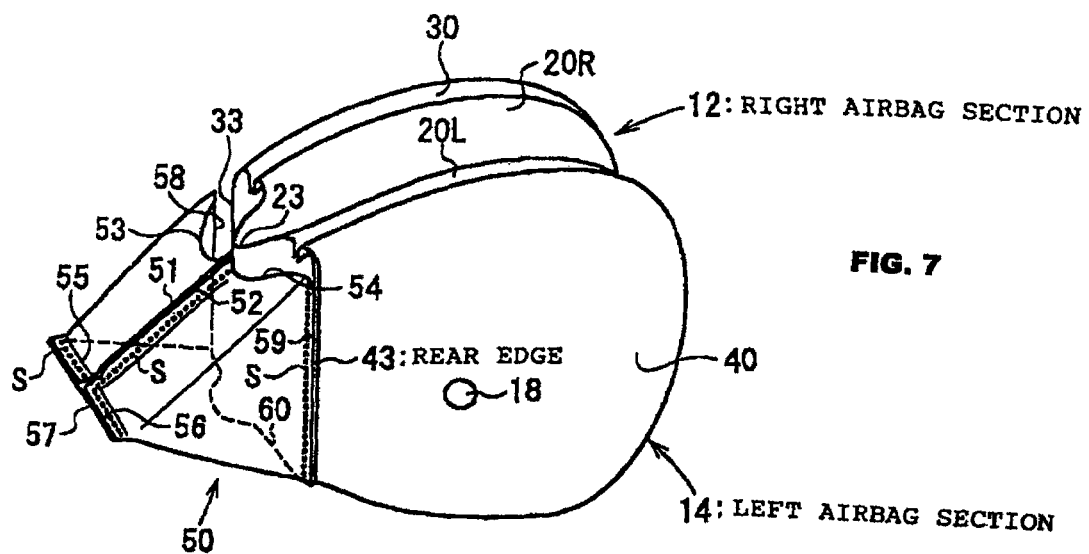
FIG. 7 is an explanatory diagram illustrating the fabrication procedures of the airbag shown in FIG. 1.

Next, as shown in FIG. 6, the rear edge 33 of the right outside panel 30 is peeled back to the tip side of the right airbag section 12 so as to expose the opening 80 of the right side 20R, and the rear edge 43 of the left outside panel 40 is peeled back to the tip side of the left airbag section 14 so as to expose the opening 80 of the left side 20L, and the perimeter portions of the openings 80 and 80 are concentrically overlapped and sewn. The reference character H in FIG. 6 illustrates the stitches.

As for the base panel 50, the facing edges 51 and 52 of the flaps 50D and 50E are sewn together beforehand, following which the rear edges 55 and 56 of the flaps 50D and 50E which have become a singular edge due to this stitching are sewn to the rear edge 57.

Note that in this embodiment, the seams of the edges 51 and 52, and the edges 55, 56, and 57, are outside of the airbag exterior, but these seams may be on the inner side of the airbag. In this case, at the time of sewing the edges 51 and 52, and the edges 55, 56, and 57, the edges are overlapped and sewn such that the outwards-facing faces when formed as an airbag product are made to face one another, thereby forming the airbag base end in an inside-out state, following which the base end panel 50 is tuned right-side-out.

Subsequently, the side front edge 58, the flap front edges 53 and 54, the side front edge 59, and the base front edge 60 of the base end panel 50, are each sewn to the rear edge 33 of the right outside panel 30, the upper edge 23 around the fold-back portion of the inside panel 20, the rear edge 43 of the left outside panel 40, and the lower edge 27 around the fold-back portion of the inside panel 20, respectively.

Thus, the airbag 10 product shown in FIG. 1 is completed.

As shown in FIG. 2, two generally parallel slits 70 and 70 are provided on the base face of the base end panel 50, with an inflator 71 being passed through the slits 70 and 70.

The airbag 10 is mounted to a passenger seat airbag device in order to protect the passenger in the passenger seat in the event of the vehicle colliding.

Though omitted in the drawings, the airbag 10 is folded and stored in a case (container), and a lid is placed on the case so as to cover the folded member of the airbag 10, thereby making up the airbag device. The lid is formed so as to be torn open by the pressing force of the airbag 10 at the time of the airbag 10 expanding.

The airbag device is installed in an airbag device installation opening provided on the upper face of the instrument panel in front of the passenger seat in an automobile.

With this airbag device, the inflator 71 performs gas discharge operations in the event of the vehicle colliding. The gas from the inflator 71 first inflates the rear chamber 16, and then flows into the right airbag section 12 and the left airbag section 14 and expands these.

With the airbag 10, the rear chamber 16 which has expanded first comes into contact with the instrument panel, and the attitude thereof is stabilized. Accordingly, the attitude of the right airbag section 12 and the left airbag section 14 is stable not only when inflation is completed but also during inflation.

With the airbag 10, the right airbag section 12 and the left airbag section 14 both communicate through openings 80 and 80 provided on the facing faces of the bags 12 and 14 at the partway portions in the direction of expansion thereof, so while expanding, the gas moves between the right airbag section 12 and the left airbag section 14 through the openings 80 and 80. Accordingly, even in the event that more gas flows from the rear chamber 16 into one of the left airbag section 14 and the right airbag section 12 than the other, the internal pressure of the left airbag section 14 and the right airbag section 12 is generally uniform since the gas flows into the other airbag section as well through the openings 80 and 80, and according expansion is generally uniform.

Also, the right airbag section 12 and the left airbag section 14 are linked to each other at the partway portions in the direction of expansion thereof by the openings 80 and 80 having been sewn together at the perimeter portions thereof, so even in the event that one of the right airbag section 12 and the left airbag section 14 starts to expand before the other, the airbag section which has started to expand first pulls the airbag section which is slower in expanding in the direction of expansion so as to promote expansion thereof, and accordingly both expand generally uniformly.

In the state that the inflation of the airbag 10 is completed, the open space 13 formed in a recessed shape between the tip portions of the bags 12 and 14 is created, and the open space 13 is opened toward the passenger. The inflated right airbag section 12 receives the right chest of the passenger, the inflated left airbag section 14 receives the left chest, and the open space 13 faces around the sternum. Accordingly, the reaction force placed on the sternum at the time of being received by the airbag is small.

Figure 8:
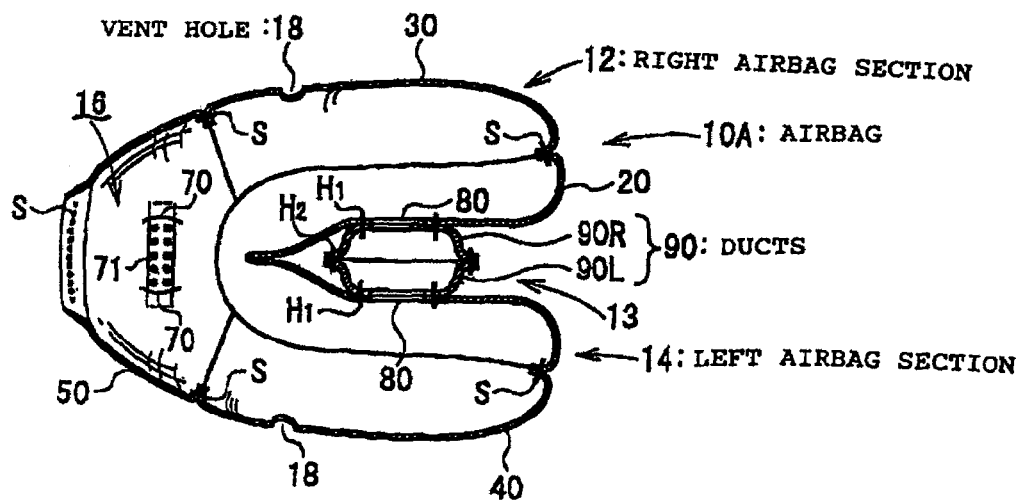
FIG. 8 is a top cross-sectional view of the airbag according to another embodiment.
Figure 9:
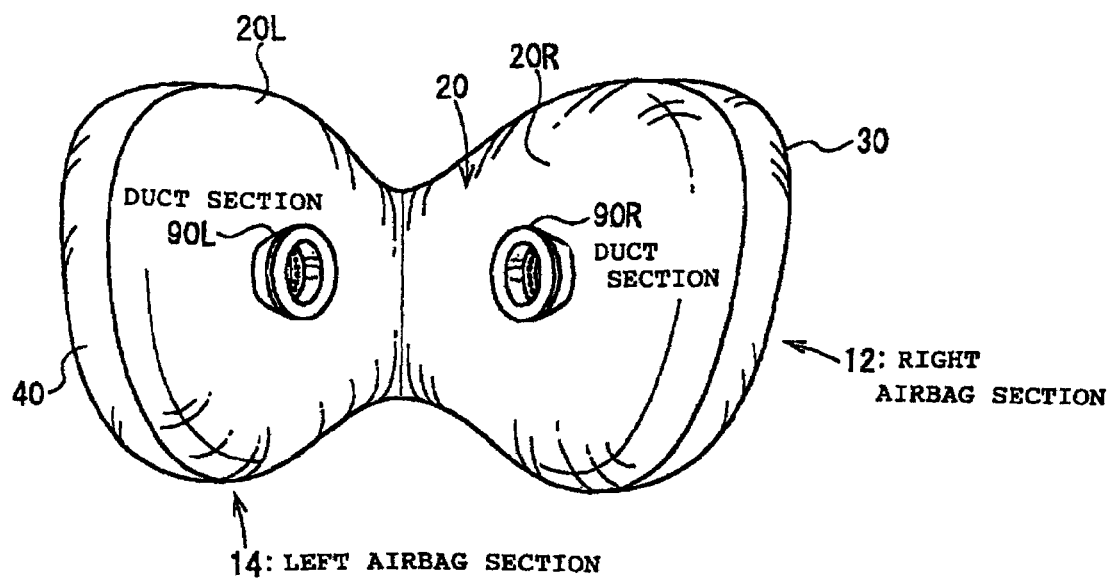
FIG. 9 is a frontal view of the airbag partway fabricated shown in FIG. 8.

FIG. 8 is a top cross-sectional view of the airbag 10A according to another embodiment of the present invention, and FIG. 9 is a frontal view of this airbag 10A partway fabricated.

This airbag 10A is an arrangement wherein the perimeter portions of the openings 80 and 80 formed on each of the facing faces of the right airbag section 12 and the left airbag section 14 partway along the direction of expansion (the right side 20R and left side 20L of the inside panel 20) are connected by a duct 90. In the present embodiment, the duct 90 is made up of a duct section 90R attached to the right side 20R of the inside panel 20, and duct section 90L attached to the left side 20L.

The following is a description of the panel configuration and fabrication procedures of the airbag 10A.

The airbag 10A also comprises an outer shell of an inside panel 20, right outside panel 30, left outside panel 40, and base end panel 50. The configuration of the panels are the same as those making up the outer shell of the airbag 10 shown in FIGS. 1 through 7 as described above, and description of the panels in the following will refer to FIG. 3 and others.

In the present embodiment, the duct sections 90R and 90L making up the duct 90 are generally donut-shaped sheet members having a center opening (reference numeral omitted).

To fabricate the airbag 10A, first, the duct section 90R is disposed on the outward-facing face of the right side 20R of the inside panel 20 (the face exposed externally when formed as an airbag product), and the perimeter portion of the opening 80 formed on the right side 20R is sewn to the perimeter portion of the center opening of the duct section 90R (edge portion of the inner perimeter of the duct section 90R); and the duct section 90L is disposed on the outward-facing face of the left side 20L of the inside panel 20, and the perimeter portion of the opening 80 formed on the left side 20L is sewn to the perimeter portion of the center opening of the duct section 90L. The reference characters H1 in FIG. 8 denote the stitches of this sewing.

Next, the base panel 50 is laid out flat, and the rear edge 33 of the right outside panel 30 and the rear edge 43 of the left outside panel 40 are each sewn to the front edges 58 and 59 of the base end panel 50, respectively. Next, the facing edges 51 and 52 of the flaps 50D and 50E of the base end panel 50 are sewn together. Subsequently, the right outside panel 30 and the right side 20R of the inside panel 20 are made to face one another, and the tip edges 21 and 31 are sewn to each other, and also the upper edges 22 and 32, and lower edges 28 and 34, respectively. Also, the left outside panel 40 and the left side 20L of the inside panel 20 are made to face one another, and the tip edges 25 and 41 are sewn to each other, and also the upper edges 24 and 42, and lower edges 26 and 44, respectively. Also, the flap front edges 53 and 54 of the base end panel 50 are sewn to the upper edge 23 around the fold-back portion of the inside panel 20, and the base front edge 60 of the base end panel 50 is sewn to the lower edge 27 around the fold-back portion.

This sewing forms the airbag 10A in an inside-out state, i.e., in a state wherein the seams are exposed on the surface of the airbag. Note that at this time, the flap rear edges 55 and 56 and the rear edge 57 of the base end panel 50 are not sewn yet, and in this state form an opening.

Now, the airbag is turned right-side-out through this opening. Sewing this opening then configures the airbag outer shell with the seams of the members within the inside.

Subsequently, as shown in FIG. 9, the edge portions on the outer perimeters of the duct sections 90L and 90R which have been attached beforehand on the outward-facing faces of the right side 20R and left side 20L of the inside panel 20 are sewn together. The reference character H2 in FIG. 8 denotes the stitches. Accordingly, a cylindrical duct 90 formed of the duct sections 90L and 90R is formed, and the faces of the right airbag section 12 and the left airbag section 14 facing each other at the partway portions in the direction of expansion are joined through the duct 90, and the airbag 10A shown in FIG. 8 wherein the right airbag section 12 and the left airbag section 14 communicate through the duct 90 and openings 80 and 80 is completed.

The two generally parallel slits 70 and 70 are provided on the bottom face portion of the base end panel 50, with this embodiment as well, with an inflator 71 being passed through the slits 70 and 70.

This airbag 10A also is mounted to a passenger seat airbag device in order to protect the passenger in the passenger seat in the event of the vehicle colliding.

The other configurations of the airbag 10A and the configuration of the airbag device having the airbag 10A are the same as the embodiment shown in FIGS. 1 through 7 described above. In FIGS. 8 and 9, the components which have the same reference symbols as with FIGS. 1 through 7 illustrate the same portions.

With this airbag 10A as well, the right airbag section 12 and the left airbag section 14 both communicate through openings 80 and 80 provided on the facing faces of the bags 12 and 14 at the partway portions in the direction of expansion thereof, and through the duct 90 connecting the perimeter portion of the openings 80 and 80, so while expanding, the gas moves between the right airbag section 12 and the left airbag section 14 through the openings 80 and 80 and the duct 90. Accordingly, even in the event that more gas flows from the rear chamber 16 into one of the right airbag section 12 and the left airbag section 14 than the other, after the gas is supplied from the inflator 71 the internal pressure of the right airbag section 12 and the left airbag section 14 is generally uniform since the gas flows into the other airbag section through the openings 80 and 80 and the duct 90, and according expansion is generally uniform.

Also, the right airbag section 12 and the left airbag section 14 are linked to each other at the partway portions in the direction of expansion thereof by the openings 80 and 80 having been connected at the perimeter portions thereof by the duct 90, so even in the event that one of the right airbag section 12 and the left airbag section 14 starts to expand before the other, so the airbag section which has started to expand first pulls the airbag section which is slower in expanding in the direction of expansion so as to promote expansion thereof, and accordingly both expand generally uniformly.

With the airbag 10A, in the state that the inflation is completed, the open space 13 formed in a recessed shape between the tip portions of the right airbag section 12 and the left airbag section 14 is created, and the open space 13 is opened toward the passenger. The inflated right airbag section 12 receives the right chest of the passenger, the inflated left airbag section 14 receives the left chest, and the open space 13 faces around the sternum. Accordingly, the reaction force placed on the sternum at the time of being received by the airbag is small.

With the airbag 10A, the perimeter portions of the openings 80 and 80 formed on the facing faces of the right airbag section 12 and the left airbag section 14 are joined with the duct 90, so even in the event that the open space 13 is formed deeply toward the base end of the right airbag section 12 and the left airbag section 14 for example, and the facing faces of the bags 12 and 14 are distanced one from another, communication between the right airbag section 12 and the left airbag section 14 can be ensured through the openings 80 and 80 and the duct 90.

Each of the above embodiments are only examples of the present invention, and the present invention is not restricted to the above embodiments.

What is claimed is:

1. An airbag comprising:
    an airbag body that is deployed for inflation thereof;
    a first, lateral portion of the airbag body for being deployed in a predetermined rearward deployment direction toward a vehicle occupant;
    a second, lateral portion of the airbag body for being deployed in the predetermined rearward deployment direction toward the vehicle occupant;
    the first and second lateral portions being of substantially the same configuration;
    rearward ends of the respective first and second lateral portions that are spaced from each other in a lateral direction transverse to the rearward deployment direction to present an open gap adjacent the vehicle occupant upon inflation of the airbag body including the lateral portions thereof; and
    a lateral opening in the airbag body that permits gas flow to both lateral portions for inflation thereof;
    wherein the lateral opening has a rearward end portion forwardly of the rearward ends of the airbag body lateral portions with the lateral portions interconnected at the rearward end portion of the lateral opening, and the rearward end portion curves rearwardly toward the rearward ends of the lateral portions.

2. The airbag of claim 1 wherein the lateral portions have the same height and the open gap therebetween extends for the full height thereof.

3. The airbag of claim 2 wherein the height of the lateral portions varies to generally increase in size in the rearward deployment direction.

4. An airbag comprising:
    an airbag body that is deployed for inflation thereof;
    a first, lateral portion of the airbag body for being deployed in a predetermined rearward deployment direction toward a vehicle occupant;
    a second, lateral portion of the airbag body for being deployed in the predetermined rearward deployment direction toward the vehicle occupant;
    the first and second lateral portions being of substantially the same configuration;
    rearward ends of the respective first and second lateral portions that are spaced from each other in a lateral direction transverse to the rearward deployment direction to present an open gap adjacent the vehicle occupant upon inflation of the airbag body including the lateral portions thereof; and a lateral opening in the airbag body that permits gas flow to both lateral portions for inflation thereof;

wherein the lateral portions have the same height and the open gap therebetween extends for the full height thereof, and the open gap comprises a recess between the lateral portions that is interrupted by the lateral opening which has a height less than the height of the lateral portions.

5. The airbag of claim 4 wherein the lateral opening has a rearward end portion forwardly of the rearward ends of the airbag body lateral portions with the lateral portions interconnected at the rearward end portion of the lateral opening.

6. The airbag of claim 5 wherein the lateral portions have the same height that is sized relative to the lateral opening so that there are sections of the lateral portions that extend above and below the lateral opening at the rearward end portion thereof.

7. The airbag of claim 4 wherein the airbag body has a pair of additional lateral openings to allow inflation gas to flow generally in the lateral direction therethrough.

8. An airbag comprising:
an airbag body that is deployed for inflation thereof;
a first, lateral portion of the airbag body for being deployed in a predetermined rearward deployment direction toward a vehicle occupant;
a second, lateral portion of the airbag body for being deployed in the predetermined rearward deployment direction toward the vehicle occupant;
the first and second lateral portions being of substantially the same configuration;
rearward ends of the respective first and second lateral portions that are spaced from each other in a lateral direction transverse to the rearward deployment direction to present an open gap adjacent the vehicle occupant upon inflation of the airbag body including the lateral portions thereof; and
a lateral opening in the airbag body that permits gas flow to both lateral portions for inflation thereof;
wherein the lateral opening has a rearward end portion forwardly of the rearward ends of the airbag body lateral portions with the lateral portions interconnected at the rearward end portion of the lateral opening, and the lateral opening comprises a rear laterally extending portion of the airbag body.

9. An airbag comprising:
an airbag body that is deployed for inflation thereof;
a first, lateral portion of the airbag body for being deployed in a predetermined rearward deployment direction toward a vehicle occupant;
a second, lateral portion of the airbag body for being deployed in the predetermined rearward deployment direction toward the vehicle occupant;
the first and second lateral portions being of substantially the same configuration;
rearward ends of the respective first and second lateral portions that are spaced from each other in a lateral direction transverse to the rearward deployment direction to present an open gap adjacent the vehicle occupant upon inflation of the airbag body including the lateral portions thereof; and
a lateral opening in the airbag body that permits gas flow to both lateral portions for inflation thereof;
wherein the airbag body has a pair of additional lateral openings to allow inflation gas to flow generally in the lateral direction therethrough, and the pair of additional lateral openings comprises one of the pair of additional lateral openings being associated with the first, lateral portion of the airbag body, and the other of the pair of additional lateral openings being associated with the second, lateral portion of the airbag body.

10. An airbag comprising:
an airbag body that is deployed for inflation thereof;
a first, lateral portion of the airbag body for being deployed in a predetermined rearward deployment direction toward a vehicle occupant;
a second, lateral portion of the airbag body for being deployed in the predetermined rearward deployment direction toward the vehicle occupant;
the first and second lateral portions being of substantially the same configuration;
rearward ends of the respective first and second lateral portions that are spaced from each other in a lateral direction transverse to the rearward deployment direction to present an open gap adjacent the vehicle occupant upon inflation of the airbag body including the lateral portions thereof; and
a lateral opening in the airbag body that permits gas flow to both lateral portions for inflation thereof;
wherein the airbag body has a pair of additional lateral openings to allow inflation gas to flow generally in the lateral direction therethrough, and the pair of additional lateral openings are generally laterally aligned across the airbag body from each other, and the lateral portions each include a vent that is offset in the rearward deployment direction from the aligned pair of additional lateral openings.

11. An airbag device for a passenger compartment of a vehicle, the airbag device comprising:
an airbag for being deployed in a rearward deployment direction toward a vehicle occupant;
left and right airbag sections of the airbag;
a forward deployment end portion of the airbag;
a left, rearward occupant engagement end portion of the left airbag section;
a right, rearward occupant engagement end portion of the right airbag section;
left and right laterally facing inner surfaces of the left and right airbag sections that extend forwardly from the respective left and right rearward occupant engagement end portions and which are laterally spaced from each other in a lateral direction transverse to the rearward deployment direction to form an open gap between the airbag sections adjacent the vehicle occupant;
a recess extending forwardly from the open gap between the left and right laterally facing inner surfaces;
a laterally facing communication opening in the airbag in communication with the left and right airbag sections for flow of inflation gas to both airbag sections; and
a rearward edge portion of the communication opening that interrupts the forwardly extending recess and interconnects the left and right airbag sections.

12. The airbag device of claim 11 wherein the rearward edge portion comprises a direct connection between the laterally facing inner surfaces of the left and right airbag sections.

13. The airbag device of claim 11 wherein the rearward edge portion curves to project rearwardly and is oriented so that upper and lower portions of the left and right airbag sections are higher and lower, respectively, than the curved, rearward edge portion.

14. The airbag device of claim 11 wherein the left and right airbag sections have the same size and configuration with the left and right airbag sections increasing in size in the rearward deployment direction between the forward end deployment portion and the rearward, occupant engagement end portions of the left and right airbag sections.

15. In combination, a vehicle and airbag device, the combination comprising:
   a passenger compartment of the vehicle;
   a passenger seat for a vehicle occupant;
   an instrument panel of the passenger compartment;
   a case of the airbag device mounted to the instrument panel;
   an airbag in the case for being deployed in a rearward deployment direction from the instrument panel rearwardly toward the passenger seat during vehicle emergency conditions;
   a rear protection portion of the airbag adjacent the vehicle seat upon airbag inflation;
   left and right restraining portions of the inflated airbag rear protection portion that are disposed side-by-side in a lateral direction transverse to the rearward deployment direction;
   a recess between the inflated left and right restraining portions for suppressing reaction force on a portion of the passenger received therein during vehicle emergency conditions; and
   a forward laterally extending portion of the airbag that engages the instrument panel upon airbag deployment for controlling positioning of the airbag left and right restraining portions during inflation thereof and providing for communication and gas flow therebetween;
   wherein the airbag has an intermediate connection in the rearward deployment direction between the left and right restraining portions that is at a forward end of the recess therebetween.

16. The combination of claim 15 wherein the passenger seat has left and right sides, and the left and right restraining portions of the inflated airbag are generally aligned with the corresponding left and right sides of the passenger seat so that the recess between the inflated left and right restraining portions are generally aligned centrally between the left and right sides of the passenger seat.

17. In combination, a vehicle and airbag device, the combination comprising:
   a passenger compartment of the vehicle;
   a passenger seat for a vehicle occupant;
   an instrument panel of the passenger compartment;
   a case of the airbag device mounted to the instrument panel;
   an airbag in the case for being deployed in a rearward deployment direction from the instrument panel rearwardly toward the passenger seat during vehicle emergency conditions;
   a rear protection portion of the airbag adjacent the vehicle seat upon airbag inflation;
   left and right restraining portions of the inflated airbag rear protection portion that are disposed side-by-side in a lateral direction transverse to the rearward deployment direction;
   a recess between the inflated left and right restraining portions for suppressing reaction force on a portion of the passenger received therein during vehicle emergency conditions; and
   a forward laterally extending portion of the airbag that engages the instrument panel upon airbag deployment for controlling positioning of the airbag left and right restraining portions during inflation thereof and providing for communication and gas flow therebetween;
   wherein the airbag has an intermediate connection in the rearward deployment direction between the left and right restraining portions that is at a rearward end of the airbag forward laterally extending portion.

18. In combination, a vehicle and airbag device, the combination comprising:
   a passenger compartment of the vehicle;
   a passenger seat for a vehicle occupant;
   an instrument panel of the passenger compartment;
   a case of the airbag device mounted to the instrument panel;
   an airbag in the case for being deployed in a rearward deployment direction from the instrument panel rearwardly toward the passenger seat during vehicle emergency conditions;
   a rear protection portion of the airbag adjacent the vehicle seat upon airbag inflation;
   left and right restraining portions of the inflated airbag rear protection portion that are disposed side-by-side in a lateral direction transverse to the rearward deployment direction;
   a recess between the inflated left and right restraining portions for suppressing reaction force on a portion of the passenger received therein during vehicle emergency conditions; and
   a forward laterally extending portion of the airbag that engages the instrument panel upon airbag deployment for controlling positioning of the airbag left and right restraining portions during inflation thereof and providing for communication and gas flow therebetween;
   wherein the airbag has a pair of inner, facing walls of the left and right restraining portions for extending in the rearward deployment direction along either side of the recess, and a pair of outer walls of the left and right restraining portions for extending in the rearward deployment direction laterally spaced from a corresponding one of the pair of inner walls, the airbag further comprising three panels for forming the outer and inner wall pairs with one enlarged panel having a symmetrical, butterfly configuration with side symmetrical portions for being folded in half so that the side symmetrical portions generally form one of the outer and inner wall pairs and the other two panels having configurations generally corresponding to the side symmetrical portions of the enlarged panel for forming the other of the outer and inner wall pairs.

19. The combination of claim 18 wherein the inflated airbag has a generally conical configuration with airbag enlarging in the rearward deployment direction so that the airbag forward portion is smaller than the airbag rearward portion.

20. The combination of claim 18 wherein each of the side symmetrical portions is connected about the outer periphery thereof to a corresponding one of the other two panels about the outer periphery thereof for forming the left and right restraining portions, and
   an inner connection between the panels or panel portions forming the pair of inner walls with the inner connection forming an edge of a lateral communication port between the airbag left and right restraining portions.

* * * * *